United States Patent
Yang et al.

(10) Patent No.: US 9,331,818 B2
(45) Date of Patent: May 3, 2016

(54) METHOD AND APPARATUS FOR OPTIMIZED HARQ FEEDBACK WITH CONFIGURED MEASUREMENT GAP

(71) Applicant: QUALCOMM Incorporated, San Diego, CA (US)

(72) Inventors: Ming Yang, San Diego, CA (US); Insung Kang, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 14/259,928

(22) Filed: Apr. 23, 2014

(65) Prior Publication Data

US 2015/0312007 A1    Oct. 29, 2015

(51) Int. Cl.
*H04L 1/18*    (2006.01)

(52) U.S. Cl.
CPC ............ *H04L 1/1854* (2013.01); *H04L 1/1812* (2013.01); *H04L 1/1832* (2013.01)

(58) Field of Classification Search
None
See application file for complete search history.

(56) References Cited

U.S. PATENT DOCUMENTS

| | | | |
|---|---|---|---|
| 7,936,731 B2* | 5/2011 | Park | H04L 1/1819 370/215 |
| 8,270,340 B2 | 9/2012 | Kazmi | |
| 9,094,996 B2* | 7/2015 | Tian | H04L 1/1822 |
| 2008/0225802 A1* | 9/2008 | Sun | H04W 56/003 370/336 |
| 2010/0034158 A1* | 2/2010 | Meylan | H04L 1/1854 370/329 |
| 2010/0290420 A1 | 11/2010 | Dalsgaard et al. | |
| 2010/0322097 A1* | 12/2010 | Jen | H04L 1/1854 370/252 |
| 2010/0322165 A1* | 12/2010 | Yoo | H04L 1/1812 370/329 |
| 2011/0141952 A1* | 6/2011 | Wang | H04L 1/1822 370/294 |
| 2011/0182247 A1* | 7/2011 | Chun | H04L 1/1812 370/329 |
| 2012/0106521 A1* | 5/2012 | Xing | H04W 48/08 370/336 |
| 2012/0190373 A1 | 7/2012 | Tenny | |
| 2014/0010189 A1 | 1/2014 | Tian et al. | |
| 2015/0043481 A1* | 2/2015 | Mucke | H04L 1/1874 370/329 |

FOREIGN PATENT DOCUMENTS

WO    WO-2013172757 A1    11/2013

* cited by examiner

*Primary Examiner* — Hong Cho
(74) *Attorney, Agent, or Firm* — Arent Fox LLP

(57) ABSTRACT

A method and apparatus for improved downlink data transport with hybrid automatic repeat request (HARQ) feedback and a measurement gap are provided. A user equipment (UE) receives from a network a transmission grant for downlink data on a first control channel. The UE receives the data from the network via a transport channel. In response to the received data, the UE determines whether transmission of an acknowledgement message falls in a measurement gap. Upon determining that the transmission of the acknowledgement message by the UE falls in the measurement gap, and prior to receiving from the network a retransmission grant for the data on the first control channel, the UE sends the acknowledgement message on a second control channel in a sub-frame following the measurement gap. The first control channel is associated with the second control channel.

28 Claims, 11 Drawing Sheets

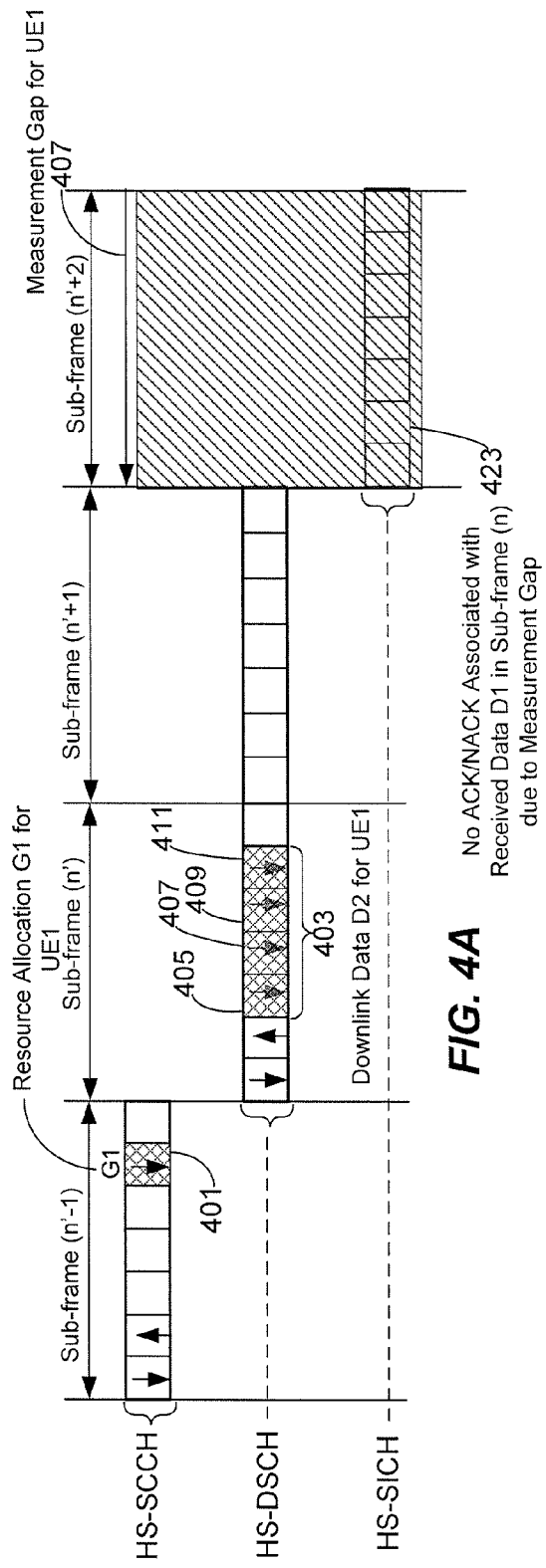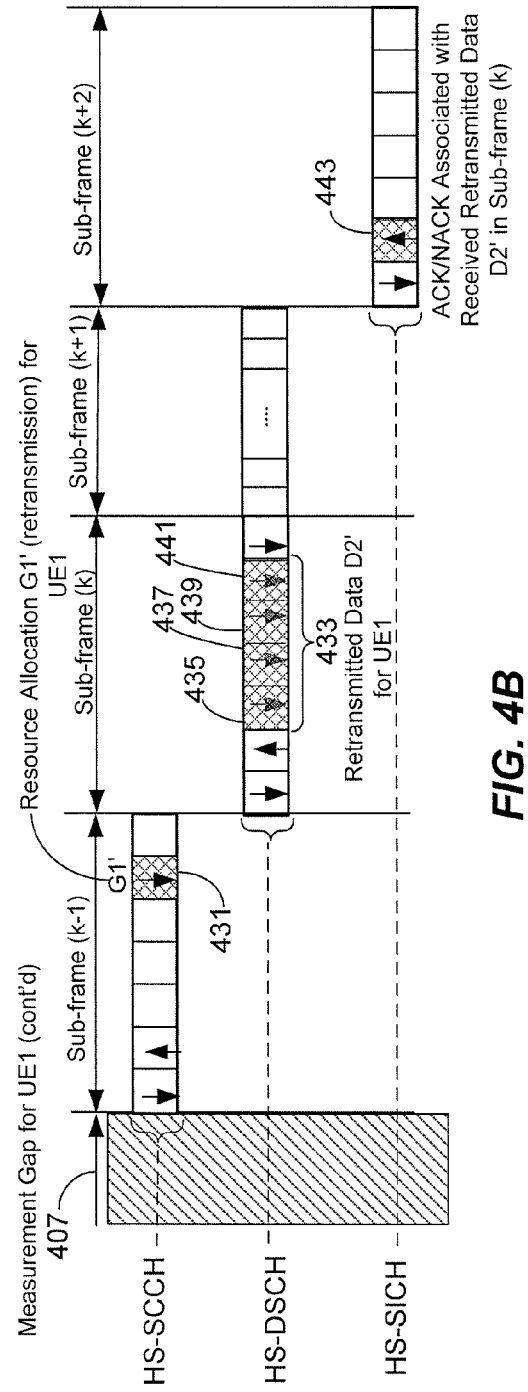

METHOD AND APPARATUS FOR OPTIMIZED HARQ FEEDBACK WITH CONFIGURED MEASUREMENT GAP

BACKGROUND

Aspects of the present disclosure relate generally to wireless communication systems, and more particularly, to techniques for improved operations of a high speed data and acknowledgement message transmission from a mobile device to a network.

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Mobile Telecommunications System (UMTS) Terrestrial Radio Access Network (UTRAN). The UTRAN is the radio access network (RAN) defined as a part of the UMTS, a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. Generally, during a high speed data transfer from a network to a user equipment, when a resource is allocated for downlink data from the network to the user equipment and the downlink data is transferred from the network to the user equipment, an acknowledgement message is sent by the user equipment. However, if there is a measurement gap for the user equipment and transmission of the acknowledgement message falls during the measurement gap, then the acknowledgement message cannot be sent by the user equipment to the network. In such a case, the user equipment waits for another resource allocation from the network (e.g., a retransmission grant for the previous downlink data) and receives from the network the previously transmitted downlink data after the measurement gap is over. That is, since there was no acknowledgement message from the user equipment corresponding the downlink data transmitted before the measurement gap, the network sends a retransmission grant for the downlink data and sends the previously sent downlink data to the user equipment. This creates unnecessary data transfers and delays in transmitting new downlink data from the network to the user equipment. As a result, there is a need for further improved techniques for downlink data transfers when a measurement gap is configured for the user equipment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Enhanced techniques of high speed downlink data and feedback (e.g., hybrid automatic repeat request (HARQ)) channels are provided. A user equipment (UE) receives from a network a transmission grant for data on a first control channel. The UE receives the data on a data transport channel from the network. With respect to the received data, the UE determines whether transmission of an acknowledgement message by the UE falls in a measurement gap, during which the UE does not receive or transmit. Upon determining that the acknowledgement message falls in the measurement gap, the UE sends the acknowledgement message on a second control channel associated with the first control channel in a sub-frame following the measurement gap, before the UE receives from the network a retransmission grant for the data on the first control channel.

In one aspect, the present disclosure provides a method of wireless communication. The method generally includes receiving at a UE data on a data transport channel from a network. The UE determines whether transmission of an acknowledgement message responsive to the received data falls in a measurement gap. The measurement gap is a time period during which the UE does not receive from or transmit to the network. Upon determining that the transmission of the acknowledgement message falls in the measurement gap and prior to receiving from the network a retransmission grant for the data on a first control channel, the UE sends the acknowledgement message on a second control channel in a sub-frame following the measurement gap. The first control channel and the second control channel are associated with each other.

Another aspect of the present disclosure provides an apparatus for wireless communications. The apparatus includes means for receiving data on a transport channel from a network, and means for determining whether transmission of an acknowledgement message responsive to the received data falls in a measurement gap, wherein the measurement gap is a time period during which the apparatus does not receive or transmit. The apparatus further includes means for, upon determining that the transmission of the acknowledgement message falls in the measurement gap, prior to receiving from the network a retransmission grant on a first control channel for the data, sending the acknowledgement message on a second control channel in a sub-frame following the measurement gap, wherein the second control channel is associated with the first control channel.

Still another aspect of the present disclosure provides an apparatus for wireless communication including at least one processor and a memory coupled to the at least one processor. The at least one processor is configured to perform operations including receiving data on a transport channel from a network and determining whether transmission of an acknowledgement message responsive to the received data falls in a measurement gap, wherein the measurement gap is a time period during which the UE does not receive or transmit. The at least one processor is further configured to, upon determining that the transmission of the acknowledgement message falls in the measurement gap, prior to receiving from the network a retransmission grant for the data on a first control channel, send the acknowledgement message on a second control channel in a sub-frame following the measurement gap, wherein the second control channel is associated with the first control channel.

Another aspect of the present disclosure provides a computer program product comprising a non-transitory computer readable medium. The non-transitory computer readable medium includes code for causing one or more processors to receive, at a user equipment, data on a transport channel from a network. The non-transitory computer readable medium further includes code for causing the one or more processors to determine, at the user equipment, whether transmission of an acknowledgement message responsive to the received data falls in a measurement gap for the user equipment. The non-transitory computer readable medium further includes code for, upon determining that the transmission of the acknowledgement message falls in the measurement gap, and prior to receiving from the network a retransmission grant on a first control channel for the data, transmit the acknowledgement message on a second control channel in a sub-frame following the measurement gap, where the second control channel is associated with the first control channel.

Another aspect of the present disclosure provides a method of wireless communication. The method generally includes sending a transmission grant for downlink data on a first control channel from a network to a user equipment (UE) and sending the downlink data to the UE on a transport channel. The method further includes determining whether transmission of an acknowledgement message responsive to the downlink data falls in a measurement gap, wherein the measurement gap is a time period during which the UE does not receive or transmit, and, upon determining that the transmission of the acknowledgement message falls in the measurement gap, delaying sending of a retransmission grant for the downlink data on the first control channel to the UE. The method further includes receiving the acknowledgement message responsive to the downlink data on a second control channel in a sub-frame following the measurement gap, wherein the second control channel is associated with the first control channel.

Another aspect of the present disclosure provides an apparatus for wireless communication including at least one processor and a memory coupled to the at least one processor. The at least one processor is configured to execute instructions stored in the memory to perform various operations including sending a transmission grant for downlink data on a first control channel from a network to a user equipment (UE). The instructions include instructions to perform operations including sending the downlink data to the UE on a transport channel associated with the first control channel and determining whether transmission of an acknowledgement message by the UE in response to the downlink data falls in a measurement gap. The instructions further include instructions to perform operations including, upon determining that the transmission of the acknowledgement message by the UE with respect to the downlink data falls in the measurement gap, delaying sending of a retransmission grant for the downlink data to the UE on the first control channel, and receiving the acknowledgement message from the UE in response to the downlink data on a second control channel in a sub-frame following the measurement gap, wherein the second control channel is associated with the first control channel.

Still another aspect of the present disclosure provides an apparatus for wireless communications. The apparatus includes means for sending a transmission grant for downlink data on a first control channel from a network to a user equipment (UE) and sending the downlink data to the UE on a transport channel. The apparatus further includes means for determining whether transmission of an acknowledgement message responsive to the downlink data falls in a measurement gap and means for, upon determining that the transmission of the acknowledgement message falls in the measurement gap, delaying sending of a retransmission grant for the downlink data on the first control channel to the UE. The apparatus further includes means for receiving the acknowledgement message responsive to the downlink data on a second control channel in a sub-frame following the measurement gap, wherein the second control channel is associated with the first control channel.

Another aspect of the present disclosure provides a computer program product comprising a non-transitory computer readable medium. The non-transitory computer readable medium includes code for causing one or more processors to send a transmission grant for downlink data on a first control channel from a network to a user equipment (UE) and send the downlink data to the UE on a transport channel. The non-transitory computer readable medium includes code for determining whether transmission of an acknowledgement message responsive to the downlink data falls in a measurement gap, and, upon determining that the transmission of the acknowledgement message falls in the measurement gap, delay sending of a retransmission grant for the downlink data on the first control channel to the UE. The non-transitory computer readable medium further includes code for receiving the acknowledgement message responsive to the downlink data on a second control channel in a sub-frame following the measurement gap, wherein the second control channel is associated with the first control channel.

Another aspect of the present disclosure provides an apparatus for wireless communication, comprising at least one processor and a memory coupled to the at least one processor. The at least one processor of the apparatus is configured to execute instructions stored in the memory to perform various operations. The various operations include sending a transmission grant for downlink data on a first control channel from a network to a user equipment (UE), and sending the downlink data to the UE on a transport channel associated with the first control channel. The operations include determining whether transmission of an acknowledgement message by the UE in response to the downlink data falls in a measurement gap, and upon determining that the transmission of the acknowledgement message by the UE with respect to the downlink data falls in the measurement gap, delaying sending of a retransmission grant for the downlink data to the UE on the first control channel. The operations further include receiving the acknowledgement message from the UE in response to the downlink data on a second control channel in a sub-frame following the measurement gap, wherein the second control channel is associated with the first control channel. Also, the transport channel may be a downlink data channel configured to carry the downlink data from the network to the UE, the first control channel may be configured to carry downlink signaling information, and the second control channel may be configured to carry feedback information including the acknowledgement message.

These and other aspects of the invention will become more fully understood upon a review of the detailed description, which follows.

BRIEF DESCRIPTION OF THE DRAWINGS

FIGS. 4A and 4B are functional block diagrams conceptually illustrating a resource allocation, downlink data transmission, and retransmission of the downlink data in view of a measurement gap.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Although various aspects of the present disclosure are discussed herein with respect to a wireless network employing a UMTS system employing a TD-SCDMA standard, the techniques and methodology of the present disclosure may be equally applicable to other types of communication systems.

Figure 1:
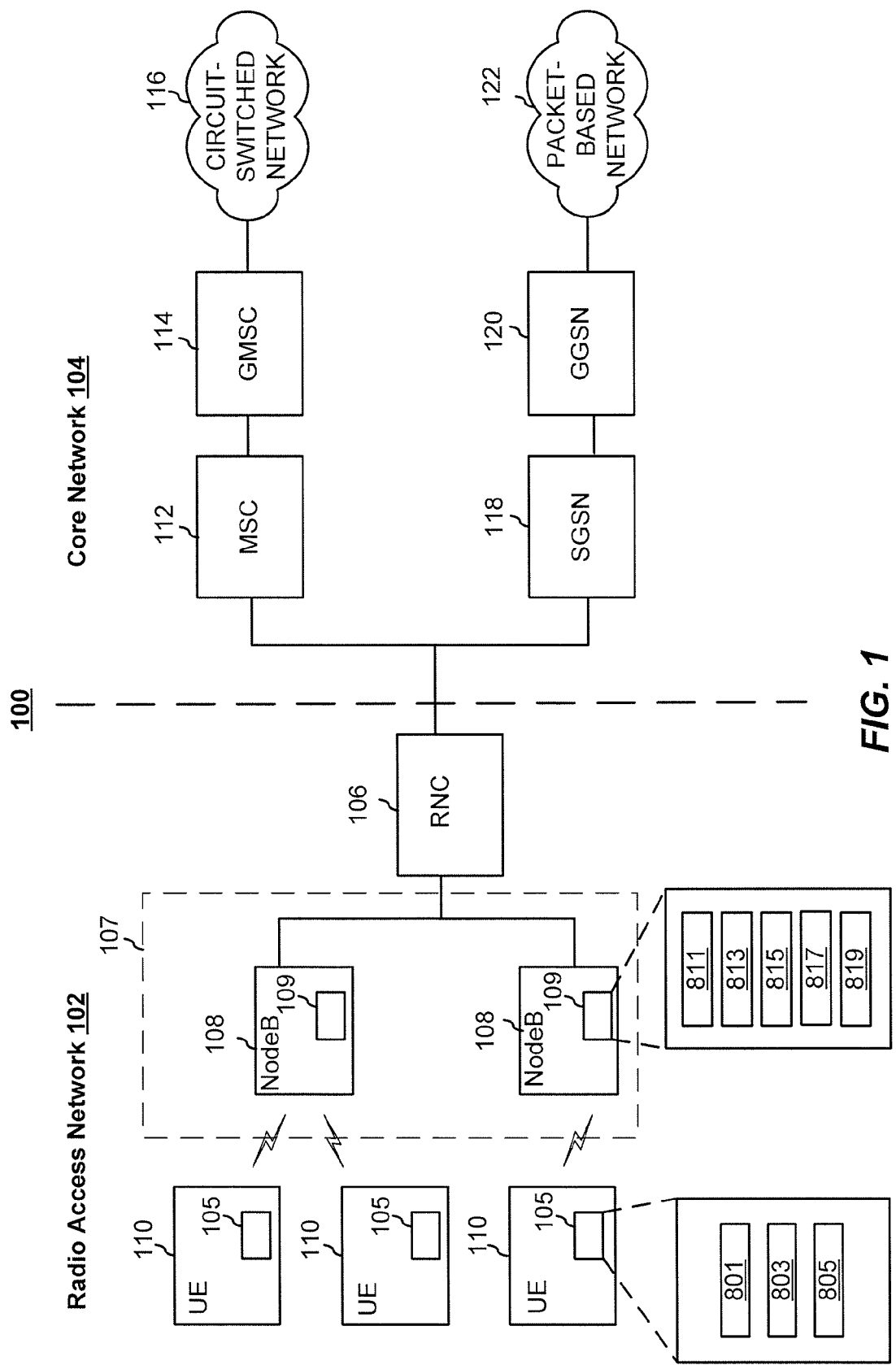
FIG. 1 is a block diagram illustrating an example of a telecommunications system.

FIG. 1 is a block diagram illustrating an example of a telecommunications system 100. Various concepts presented throughout this disclosure may be utilized across a broad array of telecommunication systems, network architectures and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNS) such as an RNS 107, each controlled by a Radio Network Controller (RNC) such as an RNC 106. For clarity, only the RNC 106 and RNS 107 are shown. However, the RAN 102 may include any number of RNCs and RNSs in addition to the RNC 106 and the RNS 107. The RNC 106 is an apparatus responsible for, among other things, assigning, reconfiguring and releasing radio resources within the RNS 107. The RNC 106 may be interconnected to other RNCs in the RAN 102 through various types of interfaces such as a direct physical connection or a virtual network, or the like, using any suitable transport network.

Communication between a UE 110 and a NodeB 108 may be considered as including a physical (PHY) layer and a medium access control (MAC) layer. Further, communication between a UE 210 and an RNC 106 by way of a respective NodeB 108 may be considered as including a radio resource control (RRC) layer. In the instant specification, the PHY layer may be considered layer 1, the MAC layer may be considered layer 2, and the RRC layer may be considered layer 3. Information herein below utilizes terminology introduced in the RRC Protocol Specification, 3GPP TS 25.331 v9.1.0, incorporated herein by reference.

The geographic region covered by the RNS 107 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two NodeBs 108 are shown; however, the RNS 107 may include any number of wireless NodeBs 108. The NodeBs 108 provide wireless access points to a core network 104 for any number of mobile apparatuses. Also, as shown in FIG. 1, each of the NodeBs 108 includes an HARQ handling component 109, which implements one or more aspects of the present disclosure described herein. The HARQ handling component 109, which is shown and explained below in detail with respect to FIG. 8B, includes a sending resource allocation component 811, a sending data component 813, a determining ACK/NACK timing component 815, a delaying retransmission grant component 817, and a receiving ACK/NACK component 819. Examples of a mobile apparatuses include a cellular phone, a smart phone, a session initiation protocol (SIP) phone, a laptop, a notebook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the NodeBs 108.

The downlink (DL), also called the forward link, refers to the communication link from a NodeB to a UE, and the uplink (UL), also called the reverse link, refers to the communication link from a UE to a NodeB. Further, each UE 110 shown in FIG. 1 includes an HARQ handling component 105, which implements one or more aspects of the present disclosure described herein. The HARQ handling component 105, which is shown and explained below in detail with respect to FIG. 8A, a receiving data component 801, a determining ACK/NACK timing component 803, and a transmitting ACK/NACK component 805.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a Mobile Switching Center (MSC) 112 and a Gateway MSC (GMSC) 114. One or more RNCs, such as the RNC 106, may be connected to the MSC 112. The MSC 112 is an apparatus that controls call setup, call routing, and UE mobility functions. The MSC 112 also includes a Visitor Location Register (VLR) (not shown) that contains subscriber related information for the duration that a UE is in the coverage area of the MSC 112. The GMSC 114 provides a gateway through the MSC 112 for the UE to access a circuit-switched network 116. The GMSC 114 includes a Home Location Register (HLR) (not shown) containing subscriber data, such as the data reflecting the details of the services to which a particular user has subscribed. The HLR is also associated with an Authentication Center (AuC) that contains subscriber specific authentication data. When a call is received for a particular UE, the GMSC 114 queries the HLR to determine the UE's location and forwards the call to the particular MSC serving that location.

The core network 104 also supports packet-data services with a Serving GPRS Support Node (SGSN) 118 and a Gateway GPRS Support Node (GGSN) 120. GPRS, which stands for General Packet Radio Service, is designed to provide packet-data services at higher speeds than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a NodeB 108 and a UE 110, but divides uplink and downlink transmissions into different time slots in the carrier.

Figure 2:
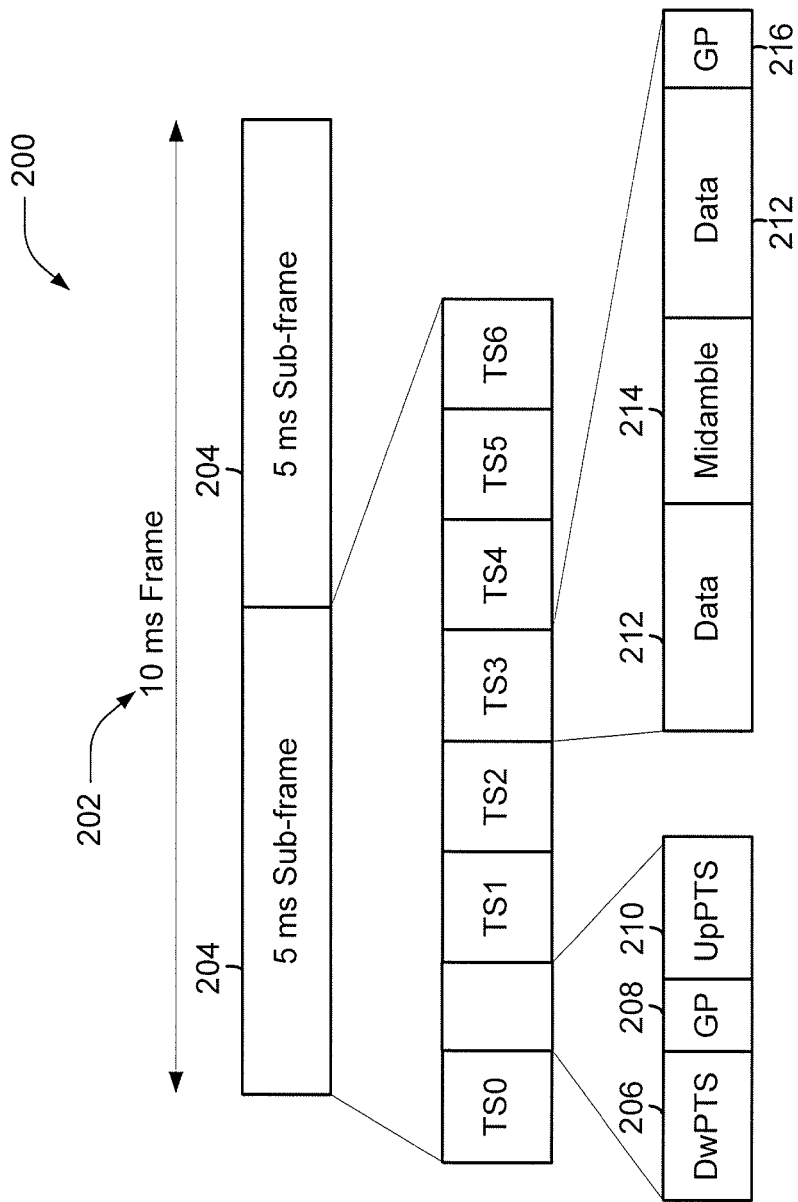
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 milliseconds (ms) in length. The frame 202 has two 5 ms sub-frames 204, and each of the sub-frames 204 includes seven time slots (TSs), TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Downlink capacity and throughput performance of the TD-SCDMA system have been improved through an introduction of a TD-SCDMA High Speed Downlink Packet Access (HS-DPA). For the operation of TD-SCDMA HSDPA, there are three HSDPA related channels: one transport channel, e.g., a High-Speed Downlink Shared Channel (HS-DSCH), and two control channels, e.g., a High-Speed Shared Control Channel (HS-SCCH) and a High-Speed Information Channel (HS-SICH). The HS-DSCH is a transport channel configured to carry the HSDPA related traffic data. The HS-SCCH is a control channel configured to carry downlink signaling information including resource allocation, and the HS-SICH is an associated control channel configured to carry feedback information of channel quality information (CQI) and information of correcting decoding or not. That is, the HS-SICH includes information on a positive acknowledgement (ACK) or a negative acknowledgement (NACK) with respect to data received on the HS-DSCH. The HS-SCCH and HS-SICH are associated with each other. In other words, the HS-SCCH is always associated with one HS-SICH carrying the ACK/NACK and CQI. The association between the HS-SCCH in the downlink and HS-SICH in the uplink is predetermined by higher layers and is common for all UEs.

Figure 3:
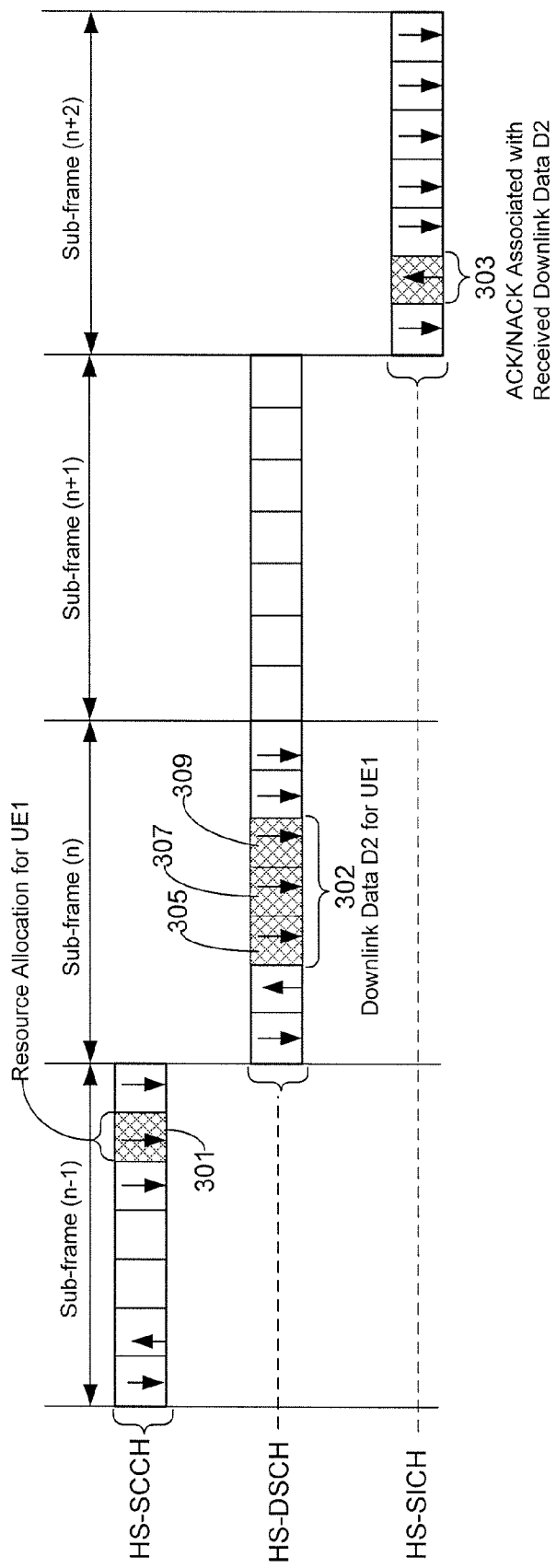
FIG. 3 is an example frame diagram conceptually illustrating relationships and operation of a transport channel and two associated control channels.

FIG. 3 is an example diagram illustrating association relationships and operation of the HS-SCCH, HS-DSCH, and HS-SICH channels. By way of example, a network or NodeB 108 indicates, via the HS-SCCH, an allocation of a resource of a communication link to a particular UE and tells the particular UE the position of downlink data packets on the following HS-DSCH.

Figure 5:
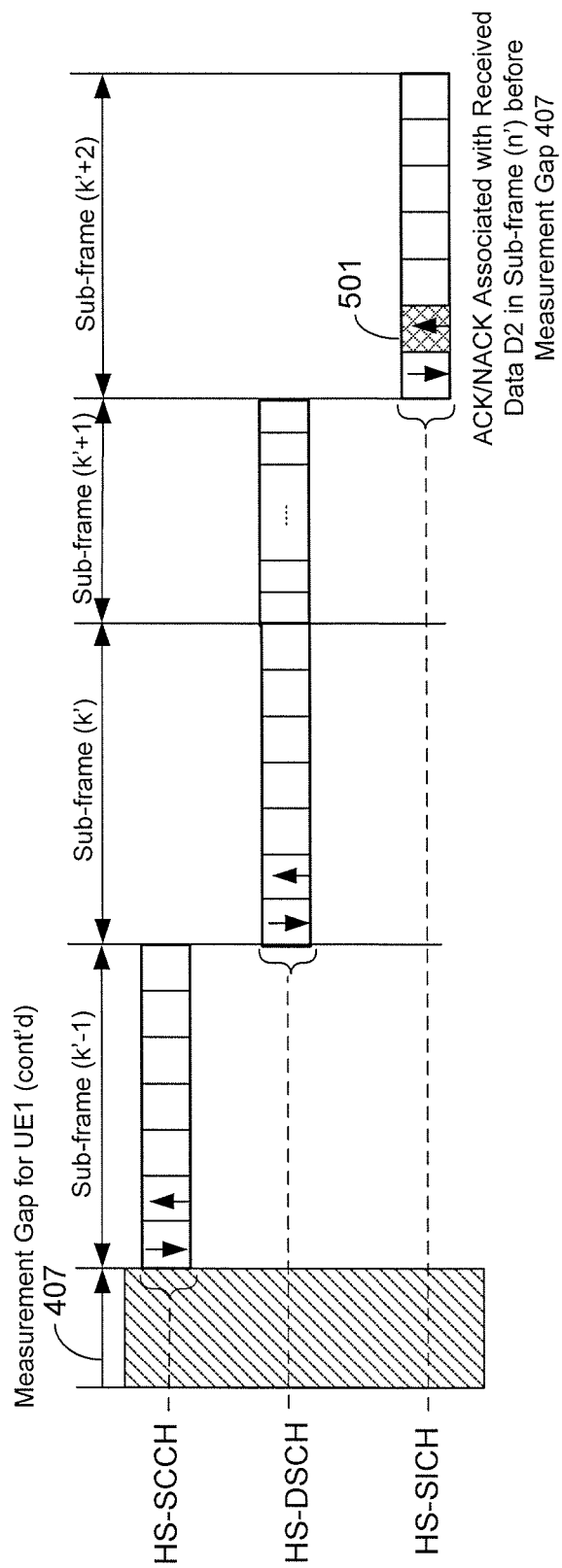
FIG. 5 is a functional block diagram conceptually illustrating transmission of an acknowledgement message in view of a measurement gap in accordance with certain aspects of the present disclosure.

In an aspect, a particular UE (e.g., UE 110 of FIG. 1) monitors the HS-SCCH for receiving information and its operation. For illustration purposes, as shown in FIGS. 3-5, a down arrow in a time slot is used to indicate that the time slot is used for downlink information, e.g., from a network to a user equipment, and an up arrow in a time slot is used to indicate that the time slot is used for uplink information, e.g., from a user equipment to the network. After monitoring the HS-SCCH, the UE determines that in the sixth time slot 301 (e.g., TS5) of the HS-SCCH in a sub-frame (n−1) there is a resource allocation information or transmission grant for the particular UE. The resource allocation information includes an identity of the particular UE and the position of downlink data packets D2 302 on the associated HS-DSCH. The UE receives downlink data packets 302 in a sub-frame (n) on the HS-DSCH and processes them. In the sub-frame (n), the downlink data packets D2 302 are transmitted in consecutive time slots 305 (TS2), 307 (TS3), and 309 (TS4). After receiving the downlink data packets 302, the UE determines whether the downlink data packets 302 have been decoded correctly or not. When it is determined that the downlink data packets 302 have been decoded correctly or successfully, the UE prepares and sends an acknowledgement message, via an associated feedback channel, e.g., the HS-SICH, indicating a positive acknowledgement (ACK) of the downlink data packets 302. The HS-SICH is associated with the resource allocation or transmission grant 301 on the HS-SCCH and/or the HS-DSCH. Otherwise, when it is determined that the downlink data packets 302 have not been decoded successfully, the UE prepares and sends an acknowledgement message, via the HS-SICH, indicating a negative acknowledgement (NACK) of the downlink data packets 302 for retransmission of the downlink data packets.

In the TD-SCDMA HSDPA, the acknowledgement message (either ACK or NACK) is transmitted to the network by the UE on the second time slot 303 (TS1) of a sub-frame (n+2) on the HS-SICH, as shown in FIG. 3. That is, the UE transmits the HS-DSCH related ACK/NACK in the next but one sub-frame, e.g., the sub-frame (n+2), following the HS-DSCH transmission. With respect to the HS-SCCH, the UE transmits the HS-SCCH related ACK/NACK on the next available, associated HS-SICH (e.g., the sub-frame (n+2)), in which the HS-SCCH and the HS-SICH are separated by two sub-frames (e.g., sub-frame (n) and sub-frame (n+1)).

Below is a description of a typical operational scenario in which the UE is to make measurements on a regular basis. That is, there is a measurement gap, in which the UE does not receive or transmit, and during which the UE performs measurements on other cells. As used herein, a "measurement gap" may refer to an amount of time available for the UE to perform measurements (e.g., signal quality measurements, traffic volume measurements, position measurements, etc.) without listening to a downlink channel with an understanding that a serving system or cell will not schedule any downlink data for the UE during such time. That is, the measurement gap is a time period during which the UE does not receive from or transmit to the currently serving cell of the UE.

FIGS. 4A and 4B illustrate an example scenario in which transmission of an acknowledgement to the network falls in the measurement gap. FIG. 5 illustrates certain aspects of the present disclosure in handling the example scenario shown in FIGS. 4A and 4B. As illustrated in FIG. 4A, by way of example, the UE (e.g., UE 110 of FIG. 1) receives a resource allocation or transmission grant G1 for downlink data packets D2 in a sub-frame (n'−1) in the sixth time slot 401 (TS5) on the HS-SCCH from a network. On the HS-DSCH, the UE receives the downlink data packets D2 403 in the time slots 405, 407, 409, and 411 (e.g., TS2-TS5) in sub-frame (n') on the HS-DSCH. However, the UE has prior knowledge of a measurement gap spanning multiple sub-frames, starting at a sub-frame (n'+2). This means that in response to the received downlink data packets D2 on the HS-DSCH (or associated with the resource allocation G1 on the HS-SCCH), the UE cannot transmit an acknowledgement message in the second time slot 423 in a sub-frame (n'+2) on the HS-SICH to the network because the transmission of the acknowledgement message falls in the measurement gap, during which the UE cannot transmit any data to the network. As noted earlier, the HS-SICH is an associated control channel (e.g., a feedback channel) corresponding to the HS-SCCH or the HS-DSCH.

In the above example scenario, as further illustrated in FIG. 4B (which is a continuation of the timeline shown in FIG. 4A), since no acknowledgement message has been received from the UE, after the end of the measurement gap 407, the network sends a resource allocation G1' 431 for retransmission of the downlink data packets D2' 433 on the HS-SCCH in a sub-frame (k−1). The UE receives the retransmitted data packets D2' 433 via time slots 435, 437, 439, and 411 on the HS-DSCH in a sub-frame (k). The received data packets D2' are processed and decoded. Based on the results of the processing and decoding of the received data, the UE then sends an acknowledgement message in a second time slot (TS1) 443 on the HS-SICH in a sub-frame (k+2), which is associated with the HS-SCCH and HS-DSCH. That is, the acknowledgement message indicating a positive acknowledgement (ACK) or a negative acknowledgement (NACK) is transmitted in the next, but one sub-frame, e.g., sub-frame (k+2), following the HS-DSCH transmission.

In the scenario shown in FIGS. 4A and 4B, even though the UE received the downlink data packets D2 in the sub-frame (n') before the measurement gap 407 and the downlink data packets D2 are successfully decoded, because transmission of an acknowledgement message by the UE regarding the downlink data packets D2 falls in the measurement gap 407, the UE cannot transmit the acknowledgement message to the network. As a result, the network sends to the UE another resource allocation (e.g., a retransmission grant G1') for the downlink data packets D2 on the HS-SCCH after the end of the measurement gap 407, and the network retransmits the downlink data packets D2' 433 on the HS-DSCH in the sub-frame (k), in response to the retransmission grant for the data D2' on the HS-SCCH in the sub-frame (k−1), which may not be necessary and create an inefficiency in the downlink transmission of data.

In certain aspects of the present disclosure, the example scenario in FIGS. 4A and 4B can be handled in a more efficient manner such that the unnecessary retransmission of the downlink data can be reduced, thereby improving the efficiency of the downlink transmission in the communication system. FIG. 5 illustrates an aspect of the present disclosure to handle the example scenario in FIGS. 4A and 4B. As shown in FIG. 5 (which is a continuation of the timeline shown in FIG. 4A), after the UE determines that the transmission of an acknowledgement message by the UE, which is in response to the received data packets D2 on the HS-DSCH in the sub-frame (n'), falls during the measurement gap 407 for the UE, the UE waits until the end of the measurement gap 407 for transmitting the acknowledgement message on the HS-SICH to the network. In fact, as shown in FIG. 5, after the completion of the measurement gap 407, the UE sends an acknowledgement message on the HI-SICH in a first available sub-frame (k'+2), but before receiving from the network any resource allocation for retransmission of the downlink data packets D2. Specifically, as illustrated in FIG. 5, the UE transmits its acknowledgement message in a second time slot 501, TS1, of the HS-SICH in the sub-frame (k'+2) after the measurement gap 407. The acknowledgement message by the UE, which is transmitted to the network on the second time slot (TS1) on the HS-SICH in the sub-frame (k'+2), corresponds to the received data packets D2 on the HS-DSCH in the sub-frame (n') before the measurement gap 407, as shown in FIG. 4A. In FIG. 5, there is no transmission of a resource allocation (e.g., a retransmission grant) from the network for the downlink data packets D2 to the UE.

That is, in the example above, when the network (or NodeB) determines whether the transmission of the acknowledgment message by the UE, regarding the downlink data packets D2, is to occur during the measurement gap 407, the network may not send any retransmission grant for the downlink packets D2 after the end of the measurement gap 407. Thus, since the timing of the measurement gap for the UE is known to both the UE and the network, the network can determine that during the measurement gap 407, the UE cannot transmit to the network any acknowledgement message regarding the downlink data D2. If it is determined that the transmission of the acknowledgment message is to occur during the measurement gap, the network may delay sending any resource allocation for the particular UE on the HS-SCCH following the measurement gap 407 until the network receives an acknowledgement message from the UE regarding the downlink data packets D2 before the measurement gap. That is, in the example, following the measurement gap, the network may wait for one or more sub-frames until it receives an acknowledgement message from the UE before sending a resource allocation for a retransmission of the previously sent data packets or a transmission of new data packets for the particular UE. When the received acknowledgement message indicates a positive acknowledgment (ACK) message from the UE after the measurement gap, the network or NodeB transmits a resource allocation for new packet data (e.g., a transmission grant) on the HS-SCCH for the UE. On the other hand, when the received acknowledgment message indicates a negative acknowledgement (NACK) message from the UE after the measurement gap, the NodeB transmits a resource allocation for the previously sent data (e.g., a retransmission grant) on the HS-SCCH for the UE.

As a result, using the present technology as disclosed herein, transmission of duplicate data packets and delays in transmission of new data packets may be avoided after the completion of the measurement gap, thereby improving downlink data throughput and efficiency of the communication system.

Figure 6:
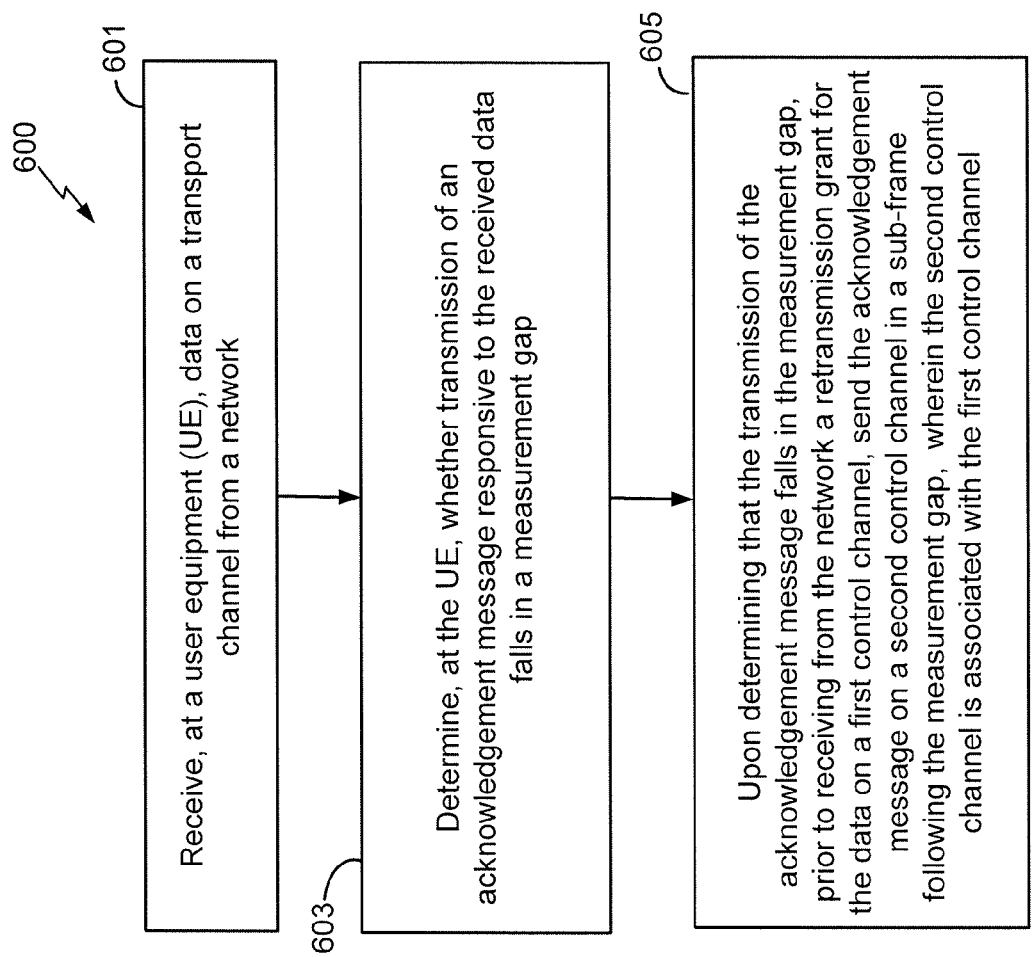
FIG. 6 is an example flowchart illustrating example operations that may be performed by a user equipment in accordance with certain aspects of the present disclosure.

FIG. 6 is an example of a flowchart 600 according to an aspect of the present disclosure relating to a user equipment (UE). As shown in FIG. 6, at block 601, the UE receives data on a transport channel (e.g., HS-DSCH) from a network (e.g., NodeB), via one or more components including a receiving data component 801 (in FIGS. 1 and 8A). At block 603, the UE determines whether transmission of an acknowledgement message responsive to the received data falls in a measurement gap for the UE, via one or more components including a determining ACK/NACK timing component 803 (in FIGS. 1 and 8A), where the measurement gap is a time period during which the UE does not receive from or transmit to the currently serving cell of the UE. The measurement gap is a configurable parameter by the network. At block 605, upon determining that the transmission of the acknowledgement message falls in the measurement gap, the UE sends, via one or more components including a transmitting ACK/NACK component 805 (in FIGS. 1 and 8A), the acknowledgement message on a second control channel in a sub-frame following the measurement gap before the UE receives from the network a retransmission grant for the data on a first control channel. The second control channel is associated with the first control channel.

Figure 7:
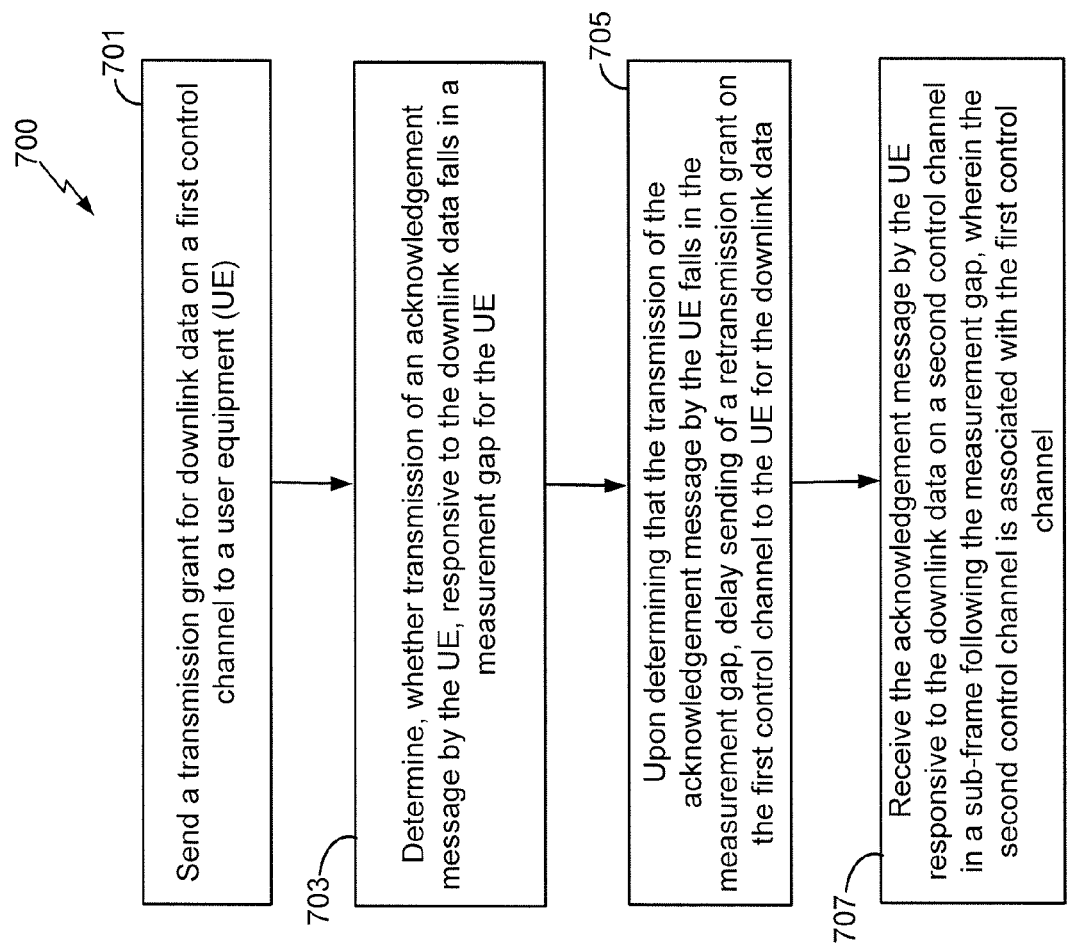
FIG. 7 is an example flowchart illustrating example operations that may be performed by a network in accordance with certain aspects of the present disclosure.

Similarly, FIG. 7 is an example of a flowchart 700 according to an aspect of the present disclosure relating to a network (or NodeB). At block 701, the network sends a transmission grant for downlink data on a first control channel to a user equipment (UE), via one or more components including a sending resource allocation component 811 and a sending data component 813 (in FIGS. 1 and 8B). At block 703, via one or more components including a determining ACK/NACK timing component 815 (in FIGS. 1 and 8B), the network determines whether transmission of an acknowledgement message by the UE, responsive to the downlink data falls in a measurement gap for the UE. At block 705, upon determining that the transmission of the acknowledgement message by the UE falls in the measurement gap, via one or more components including a delaying retransmission grant component 817 (in FIGS. 1 and 8B), the network delays sending of a retransmission grant on the first control channel to the UE for the data. At block 707, via one or more components including a receiving ACK/NACK component 819 (in FIGS. 1 and 8B), the network receives the acknowledgement message by the UE responsive to the data on a second control channel in a sub-frame following the measurement gap.

The present disclosure can be implemented via various hardware components, software, and combinations thereof, on a user equipment or a network element (e.g., NodeB).

Figure 8:
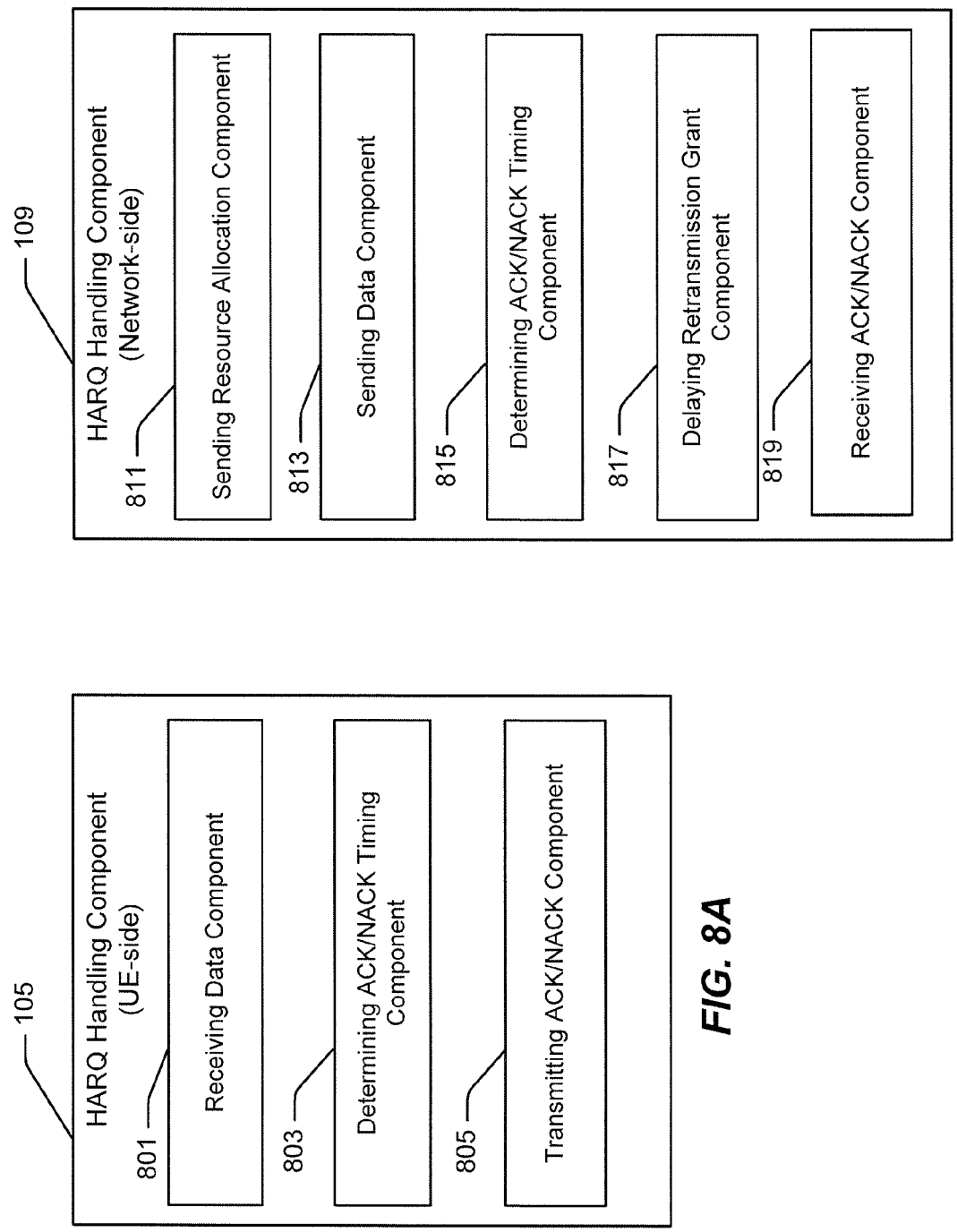
FIGS. 8A and 8B are functional block diagrams conceptually illustrating HARQ handling components in accordance with certain aspects of the present disclosure.

FIG. 8A illustrates an example of a user equipment side HARQ component, such as a HARQ handling component 105 in accordance with certain aspects of the present disclosure. The HARQ handling component 105 includes various means or components, such as a receiving data component 801, a determining ACK/NACK timing component 803, and a transmitting ACK/NACK component 805. The receiving data component 801 is configured to receive, at the UE, data on transport channel from a network. The determining ACK/NACK timing component 803 is configured to determine, at the UE, whether transmission of an acknowledgement message responsive to the received data falls in a measurement gap for the UE, where the measurement gap is a time period during which the UE does not receive or transmit. The transmitting ACK/NACK component 805 is configured to, upon determining that the transmission of the acknowledgement message falls in the measurement gap, prior to receiving from the network a retransmission grant for the data on a first control channel, send the acknowledgment message on a second control channel in a sub-frame following the measurement gap, where the second control channel is associated with the first control channel.

Similarly, FIG. 8B illustrates an example of a network side HARQ component, such as an HARQ handling component 109 for implementing various aspects of the present disclosure. The HARQ handling component 109 includes various means or components, such as a sending resource allocation component 811, a sending data component 813, a determining ACK/NACK timing component 815, a delaying retransmission grant component 817, and a receiving ACK/NACK component 819.

The sending resource allocation component 811 is configured to send a resource allocation or a transmission grant for downlink data on a first control channel to a user equipment (UE). The determining ACK/NACK timing component 815 is configured to determine whether transmission of an acknowledgement message by the UE, responsive to the downlink data falls in a measurement gap for the UE, during which the UE does not receive or transmit. The delaying retransmission grant component 817 is configured to, upon determining that the transmission of the acknowledgement message by the UE falls in the measurement gap, delay sending of a retransmission grant on the first control channel to the UE for the downlink data. The receiving ACK/NACK component 819 is configured to receive the acknowledgement message by the UE responsive to the downlink data on a second control channel in a sub-frame following the measurement gap, where the second control channel is associated with the first control channel.

Figure 9:
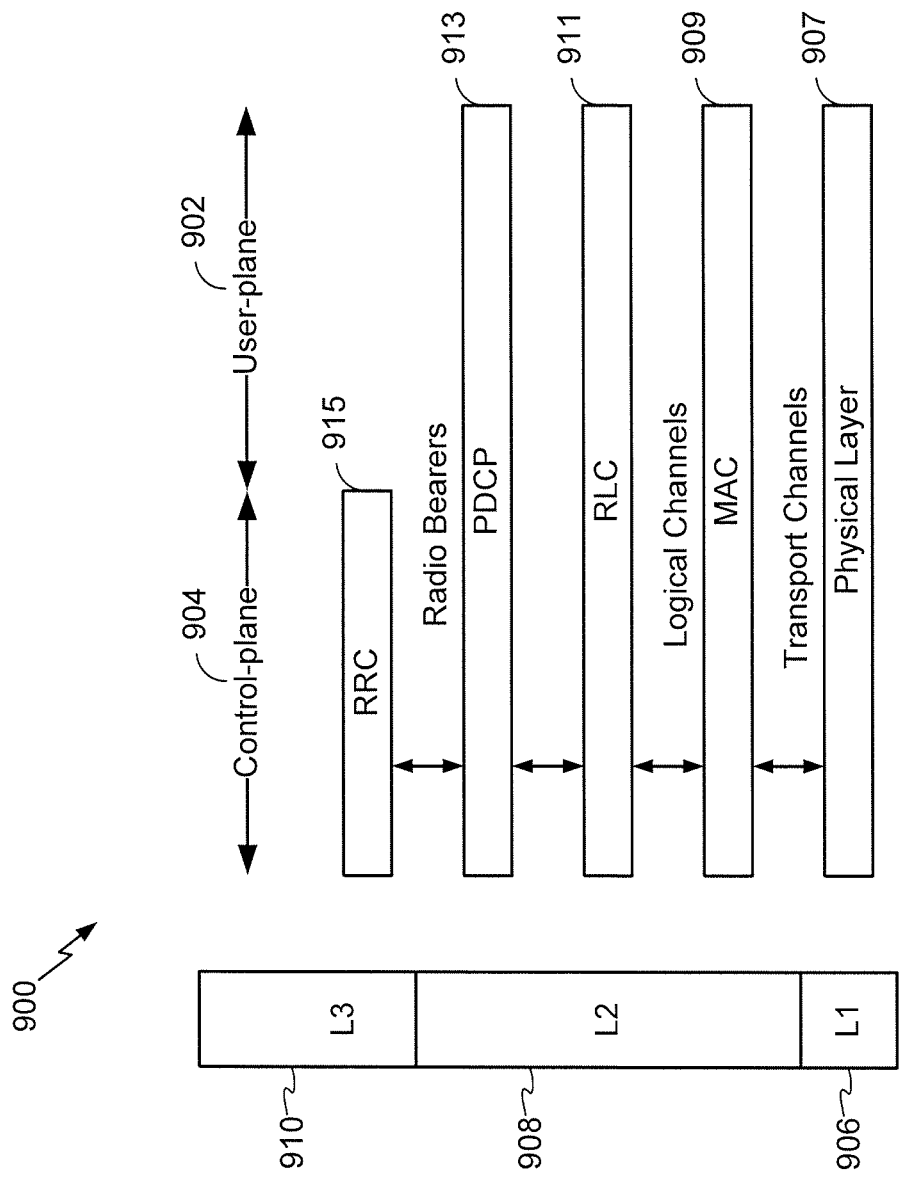
FIG. 9 is a block diagram conceptually illustrating an example of a radio protocol architecture relating to a user plane and control plane.

FIG. 9 is an example of a radio protocol architecture 900 relating to the user plane 902 and the control plane 904 of a UE or NodeB (or base station). For example, architecture 900 may be included in a UE such as the UE 110 (in FIG. 1). The radio protocol architecture 900 for the UE and NodeB is shown with three layers: Layer 1 906, Layer 2 908, and Layer 3 910. Layer 1 906 is the lowest layer and implements various physical layer signal processing functions. As such, Layer 1 906 includes the physical layer 907. Layer 2 (L2 layer) 908 is above the physical layer 907 and is responsible for the link between the UE and NodeB over the physical layer 907. Layer 3 (L3 layer) 910 includes a radio resource control (RRC) sublayer 915. The RRC sublayer 915 handles the control plane signaling of Layer 3 between the UE and the UTRAN.

In the user plane, the L2 layer 908 includes a media access control (MAC) sublayer 909, a radio link control (RLC) sublayer 911, and a packet data convergence protocol (PDCP) 913 sublayer, which are terminated at the NodeB on the network side. Although not shown, the UE may have several upper layers above the L2 layer 908 including a network layer (e.g., IP layer) that is terminated at a gateway on the network side, and an application layer that is terminated at the other end of the connection (e.g., far end UE, server, etc.).

The PDCP sublayer 913 provides multiplexing between different radio bearers and logical channels. The PDCP sublayer 913 also provides header compression for upper layer data packets to reduce radio transmission overhead, security by ciphering the data packets, and handover support for UEs between NodeBs. The RLC sublayer 911 provides segmentation and reassembly of upper layer data packets, retransmission of lost data packets, and reordering of data packets to compensate for out-of-order reception due to hybrid automatic repeat request (HARQ). The MAC sublayer 909 provides multiplexing between logical and transport channels. The MAC sublayer 909 is also responsible for allocating the various radio resources (e.g., resource blocks) in one cell among the UEs. The MAC sublayer 909 is also responsible for HARQ operations.

Figure 10:
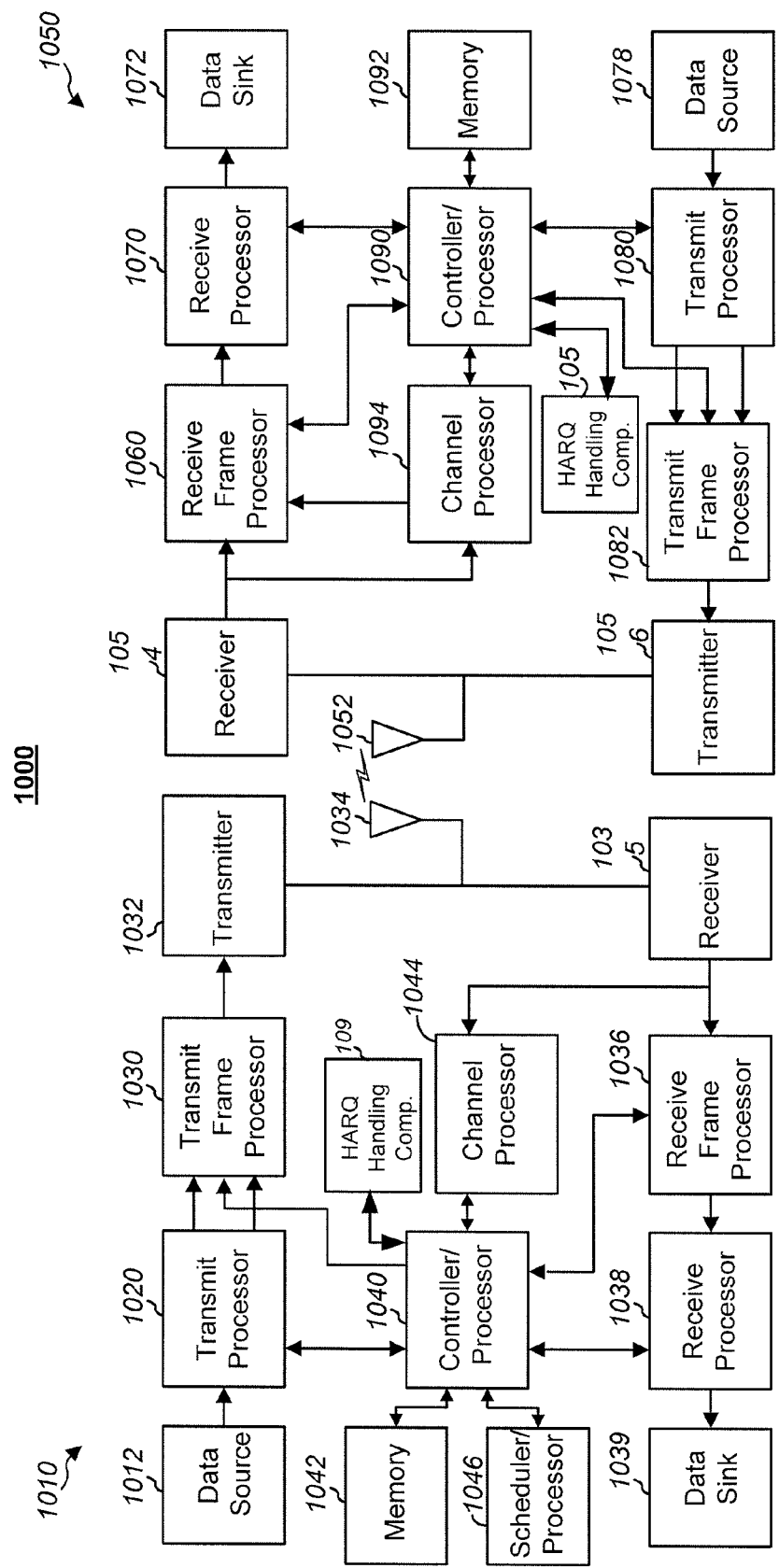
FIG. 10 is a block diagram conceptually illustrating an example of a NodeB in communication with a UE in a telecommunications system.

FIG. 10 is a block diagram of a NodeB 1010 in communication with a UE 1050, where the NodeB 1010 may be an example of the NodeB 108 in FIG. 1, and the UE 1050 may be an example of the UE 110 in FIG. 1. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the NodeB 1010. More specifically, the receive processor 1070 descrambles and despreads the symbols, and then determines the most likely signal constellation points transmitted by the NodeB 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use a positive acknowledgement (ACK) and/or a negative acknowledgement (NACK) protocol, in conjunction with a HARQ handling component 105, to support retransmission requests for those frames, in accordance with the present disclosure. Further, alternatively, the controller/processor 1090 may be coupled to the HARQ handling component 105 which is configured to perform various HARQ related operations for the UE 1050, in accordance with various aspects of the present disclosure.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the NodeB 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the NodeB 1010 or from feedback contained in the midamble transmitted by the NodeB 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the NodeB 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use a positive acknowledgement (ACK) and/or a negative acknowledgement (NACK) protocol, in conjunction with a HARQ handling component 109, to support retransmission requests for those frames in accordance with the various aspects of the present disclosure. Alternatively, the controller/processor 1040 may be coupled to the HARQ handling component 109 which is configured to perform HARQ related operations in accordance with various aspects of the present disclosure.

The controller/processors 1040 and 1090 may be used to direct the operation at the NodeB 1010 and the UE 1050, respectively. For example, the controller/processors 1040 and 1090 may provide various functions including timing, peripheral interfaces, voltage regulation, power management, TCP transmission control, improved HARQ handling (relating to the HARQ handling component 105 or 109), and other control functions. The computer readable media of memories 1042 and 1092 may store data and software for the NodeB 1010 and the UE 1050, respectively. A scheduler/processor 1046 at the NodeB 1010 may be used to allocate resources to the UEs and schedule downlink and/or uplink transmissions for the UEs.

Figure 11:
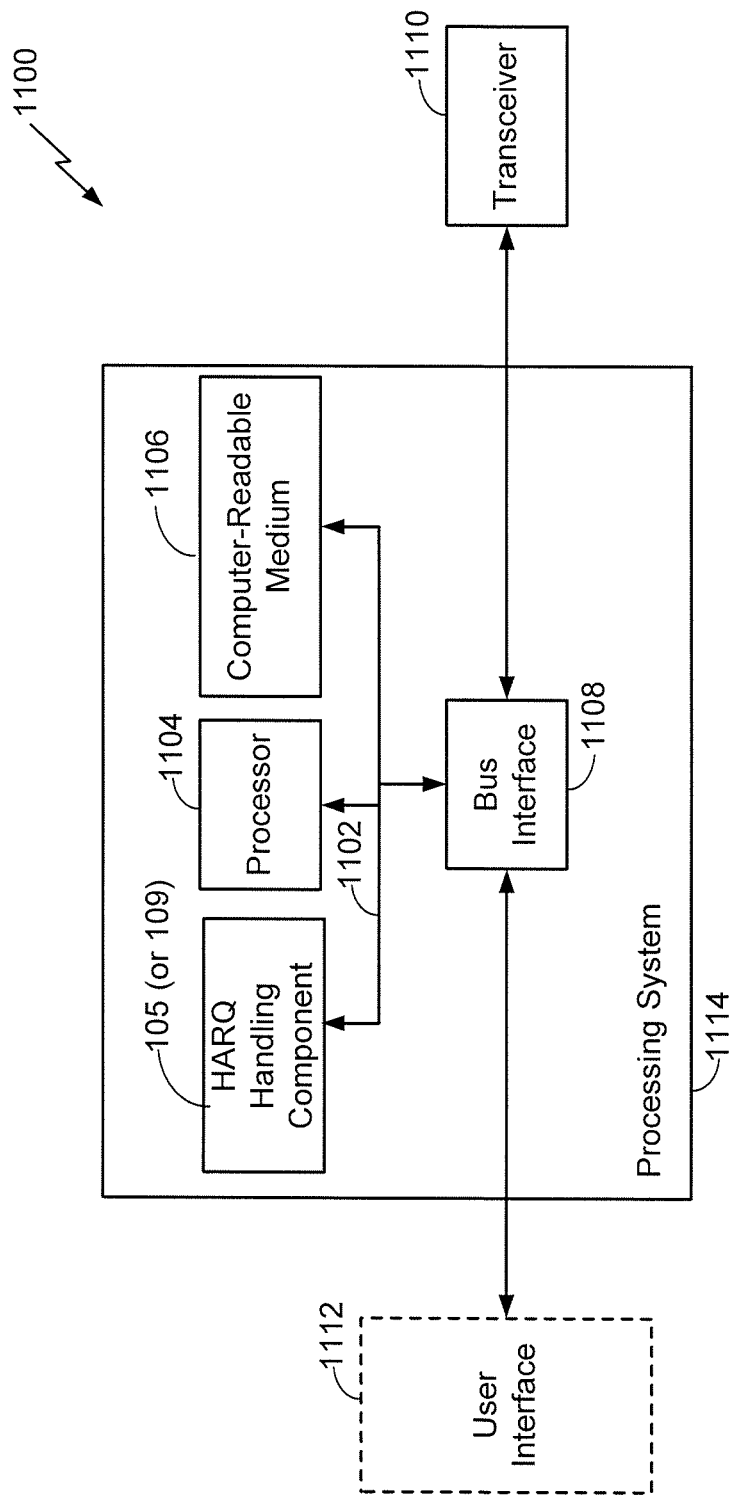
FIG. 11 is a block diagram conceptually illustrating an apparatus for wireless communication in accordance with certain aspects of the present disclosure.

FIG. 11 is a block diagram illustrating an example of a hardware implementation for an apparatus 1100 employing a processing system 1114. The apparatus 1100 can be any communications device including a UE or a NodeB. In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors, represented generally by the processor 1104, and computer-readable media, represented generally by the computer-readable medium 1106, and the HARQ handling component 105 or 109. The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium. Depending upon the nature of the apparatus, a user interface 1112 (e.g., keypad, display, speaker, microphone, joystick) may also be provided.

The processor 1104 is responsible for managing the bus 1102 and general processing, including the execution of software stored on the computer-readable medium 1106. The software, when executed by the processor 1104, causes the processing system 1114 to perform the various functions described herein for any particular apparatus. The computer-readable medium 1106 may also be used for storing data that is manipulated by the processor 1104 when executing software. Further, the various aspects of the present disclosure can be performed by the processor 1104, HARQ handling component 105 (or 109), or any combination thereof.

Thus, the present disclosure relating to downlink data transfers and HARQ handling techniques with a configured measurement gap for a UE allows the optimized downlink data transfers and further improves capacity and efficiency of a communication system.

Several aspects of a telecommunications system have been presented with reference to a TD-SCDMA system, in particular, embodying High Speed Downlink Packet Access (HS-DPA). As those skilled in the art will readily appreciate, various aspects described throughout this disclosure may be extended to other telecommunication systems, network architectures and communication standards.

By way of example, various aspects may be extended to other UMTS systems such as High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, or 35 U.S.C. §112(f), whichever is appropriate, unless the element is expressly recited using the phrase "means for" or, in the case of a method claim, the element is recited using the phrase "step for."

What is claimed is:

1. A method of wireless communication, comprising:
    receiving, at a user equipment (UE), data on a transport channel from a network;
    determining, at the UE, whether transmission of an acknowledgement message responsive to the received data falls in a measurement gap for the UE; and
    upon determining that the transmission of the acknowledgement message falls in the measurement gap, and prior to receiving from the network a retransmission grant on a first control channel for the data, transmitting the acknowledgement message on a second control channel in a sub-frame following the measurement gap, wherein the second control channel is associated with the first control channel and different from the first control channel.

2. The method of claim 1, wherein the transport channel is a downlink data channel configured to carry data from the network to the UE, the first control channel is configured to carry downlink signaling information, and the second control channel is configured to carry feedback information including the acknowledgement message.

3. The method of claim 1, wherein the network includes a base station configured to support a Time Division Synchronous Code Division Multiple Access (TD-SCDMA).

4. The method of claim 1, wherein the transport channel is a High-Speed Downlink Shared Channel (HS-DSCH), the first control channel is a High-Speed Shared Control Channel (HS-SCCH), and the second control channel is a High-Speed Shared Information Channel (HS-SICH).

5. The method of claim 1, wherein the acknowledgement message indicates either a positive acknowledgement (ACK) or negative acknowledgement (NACK) with respect to the received data on the transport channel.

6. The method of claim 1, wherein the retransmission grant for the data on the first control channel includes identification information of the UE.

7. The method of claim 1, wherein the first control channel and the second control channel are separated in time by at least two sub-frames.

8. An apparatus for wireless communication, comprising:
    means for receiving, at a user equipment (UE), data on a transport channel from a network;
    means for determining whether transmission of an acknowledgement message responsive to the received data falls in a measurement gap for the UE; and
    means for, upon determining that the transmission of the acknowledgement message falls in the measurement gap, and prior to receiving from the network a retransmission grant on a first control channel for the data, sending the acknowledgement message on a second control channel in a sub-frame following the measurement gap, wherein the second control channel is associated with the first control channel and different from the first channel.

9. The apparatus of claim 8, wherein the transport channel is a downlink data channel configured to carry data from the network to the UE, the first control channel is configured to carry downlink signaling information, and the second control channel is configured to carry feedback information including the acknowledgement message.

10. The apparatus of claim 8, wherein the network includes a base station configured to support a Time Division Synchronous Code Division Multiple Access (TD-SCDMA).

11. The apparatus of claim 8, wherein the transport channel is a High-Speed Downlink Shared Channel (HS-DSCH), the first control channel is a High-Speed Shared Control Channel (HS-SCCH), and the second control channel is a High-Speed Shared Information Channel (HS-SICH).

12. The apparatus of claim 8, wherein the acknowledgement message indicates either a positive acknowledgement (ACK) or negative acknowledgement (NACK) with respect to the received data on the transport channel.

13. The apparatus of claim 8, wherein the retransmission grant for the data on the first control channel includes identification information of the apparatus.

14. The apparatus of claim 8, wherein the first control channel and the second control channel are separated in time by at least two sub-frames each sub-frame comprising seven time slots.

15. An apparatus for wireless communication, comprising:
    at least one processor; and
    a memory coupled to the at least one processor, wherein the at least one processor is configured to execute instructions stored in the memory to perform operations including:
    receiving, at a user equipment (UE), data from a network on a transport channel;
    determining whether transmission of an acknowledgement message responsive to the received data falls in a measurement gap for the UE; and
    upon determining that the transmission of the acknowledgement message falls in the measurement gap, and prior to receiving from the network a retransmission grant on a first control channel for the data, sending the acknowledgement message on a second control channel in a sub-frame following the measurement gap, wherein the second control channel is associated with the first control channel and different from the first control channel.

16. The apparatus of claim 15, wherein the transport channel is a downlink data channel configured to carry data from the network to the UE, the first control channel is configured to carry downlink signaling information, and the second control channel is configured to carry feedback information including the acknowledgement message.

17. The apparatus of claim 15, wherein the network includes a base station configured to support a Time Division Synchronous Code Division Multiple Access (TD-SCDMA).

18. The apparatus of claim 15, wherein the transport channel is a High-Speed Downlink Shared Channel (HS-DSCH), the first control channel is a High-Speed Shared Control Channel (HS-SCCH), and the second control channel is a High-Speed Shared Information Channel (HS-SICH).

19. The apparatus of claim 15, wherein the acknowledgement message indicates either a positive acknowledgement (ACK) or negative acknowledgement (NACK) with respect to the received data on the transport channel.

20. The apparatus of claim 15, wherein the retransmission grant for the data on the first control channel includes identification information of the UE.

21. The apparatus of claim 15, wherein the first control channel and the second control channel are separated in time by at least two sub-frames each sub-frame comprising seven time slots.

22. A method of wireless communication, comprising:
sending a transmission grant for downlink data on a first control channel from a network to a user equipment (UE);
sending the downlink data to the UE on a transport channel associated with the first control channel;
determining whether transmission of an acknowledgement message by the UE in response to the downlink data falls in a measurement gap
upon determining that the transmission of the acknowledgement message by the UE with respect to the downlink data falls in the measurement gap, delaying sending of a retransmission grant for the downlink data to the UE on the first control channel; and
receiving the acknowledgement message from the UE in response to the downlink data on a second control channel in a sub-frame following the measurement gap, wherein the second control channel is associated with the first control channel and different from the first control channel.

23. The method of claim 22, wherein the transport channel is a downlink data channel configured to carry the downlink data from the network to the UE, the first control channel is configured to carry downlink signaling information, and the second control channel is configured to carry feedback information including the acknowledgement message.

24. The method of claim 22, wherein the network includes a base station configured to support a Time Division Synchronous Code Division Multiple Access (TD-SCDMA).

25. The method of claim 22, wherein the transport channel is a High-Speed Downlink Shared Channel (HS-DSCH), the first control channel is a High-Speed Shared Control Channel (HS-SCCH), and the second control channel is a High-Speed Shared Information Channel (HS-SICH).

26. The method of claim 22, wherein the acknowledgement message indicates either a positive acknowledgement (ACK) or negative acknowledgement (NACK) with respect to the received downlink data on the transport channel.

27. The method of claim 22, wherein the retransmission grant for the downlink data on the first control channel includes identification information of the UE.

28. The method of claim 22, wherein the first control channel and the second control channel are separated in time by at least two sub-frames each sub-frame comprising seven time slots.

* * * * *